2 Sheets—Sheet 2.

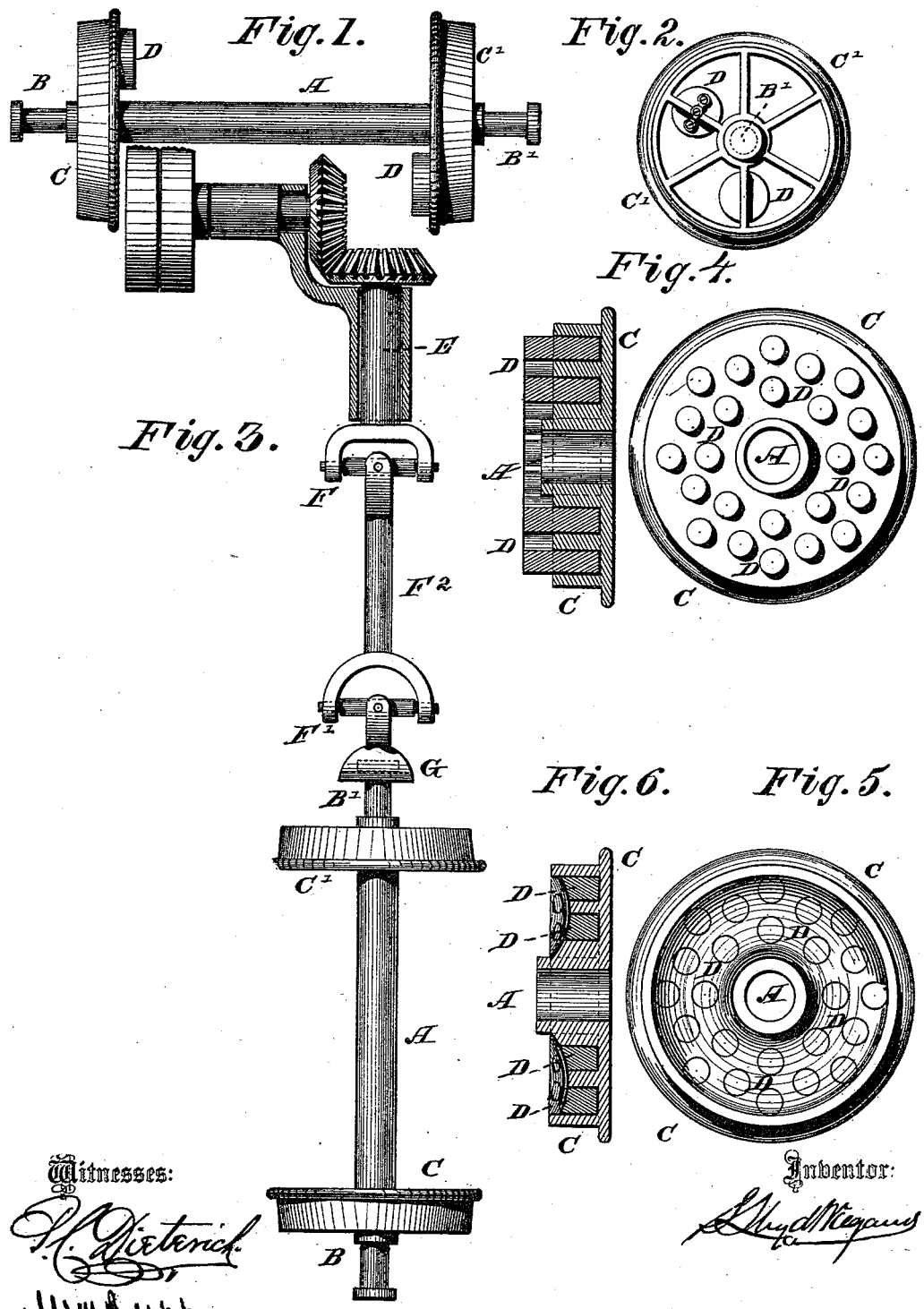
S. L. WIEGAND.
Car-Wheel.
No. 213,270. Patented Mar. 11, 1879.

S. L. WIEGAND.
Car-Wheel.

No. 213,270. Patented Mar. 11, 1879.

Witnesses:

Inventor:

N. PETERS, PHOTO-LITHOGRAPHER, WASHINGTON, D. C.

UNITED STATES PATENT OFFICE.

S. LLOYD WIEGAND, OF PHILADELPHIA, PENNSYLVANIA, ASSIGNOR OF ONE-HALF HIS RIGHT TO WALTER J. BUDD, OF SAME PLACE.

IMPROVEMENT IN CAR-WHEELS.

Specification forming part of Letters Patent No. 213,270, dated March 11, 1879; application filed September 30, 1878.

*To all whom it may concern:*

Be it known that I, S. LLOYD WIEGAND, of the city and county of Philadelphia, and State of Pennsylvania, have invented certain new and useful Improvements in the Wheels and Axles of Locomotive-Engines, Cars, and Carriages; and I do hereby declare the following to be a sufficiently full, clear, and exact description thereof, reference being had to the accompanying drawings, forming a component part of this specification, to enable others skilled in the art to make and use the said invention.

The object of my invention is to avoid or diminish the vibration and sound or noise caused by wheeled vehicles and locomotive-engines; and this invention may be briefly stated to consist of wheels and axles, or any other parts rotating with them, so adjusted that the axis of rotation shall be coincident with the geometric axes of the journal-bearings, and the wheel-treads and all the rotating matter so disposed as to effect an equilibrium of centrifugal forces around the axis of rotation, and thus avoid all tendency of the wheels and axles to gyrate with their geometric axes out of line with their axes of rotation, and in this manner obviating the concussions upon the journals and wheels and rails or other roadway incident to wheels as heretofore used. The balancing is not a mere balancing as to terrestrial gravitation, but also as to centrifugal force.

Figure 7:
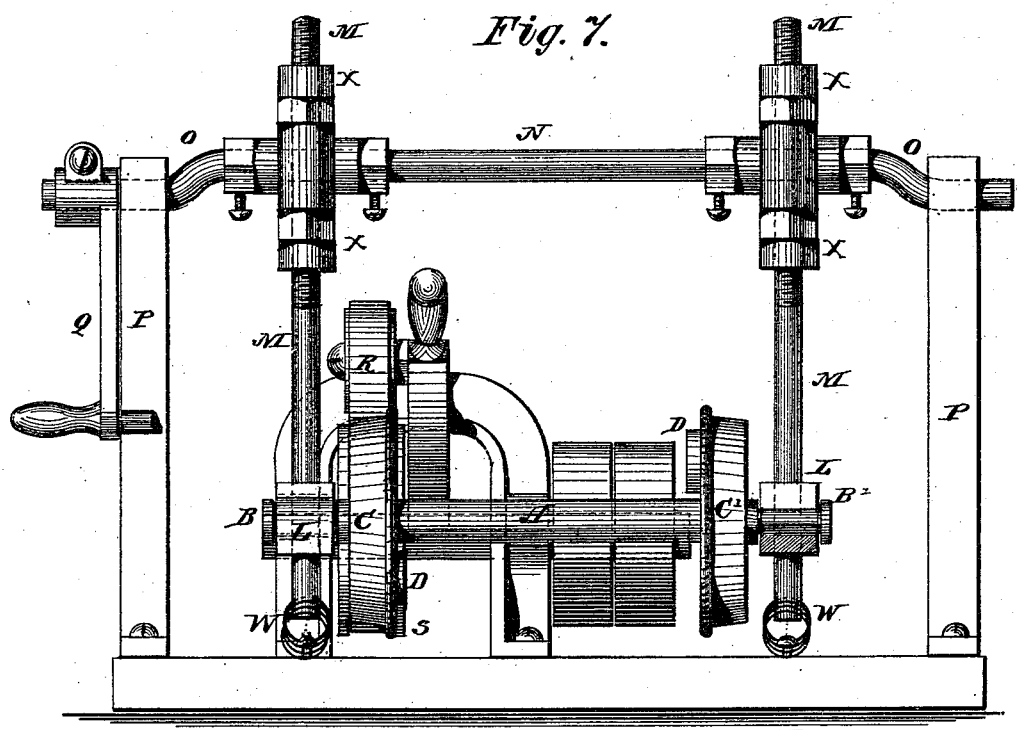
Figure 8:
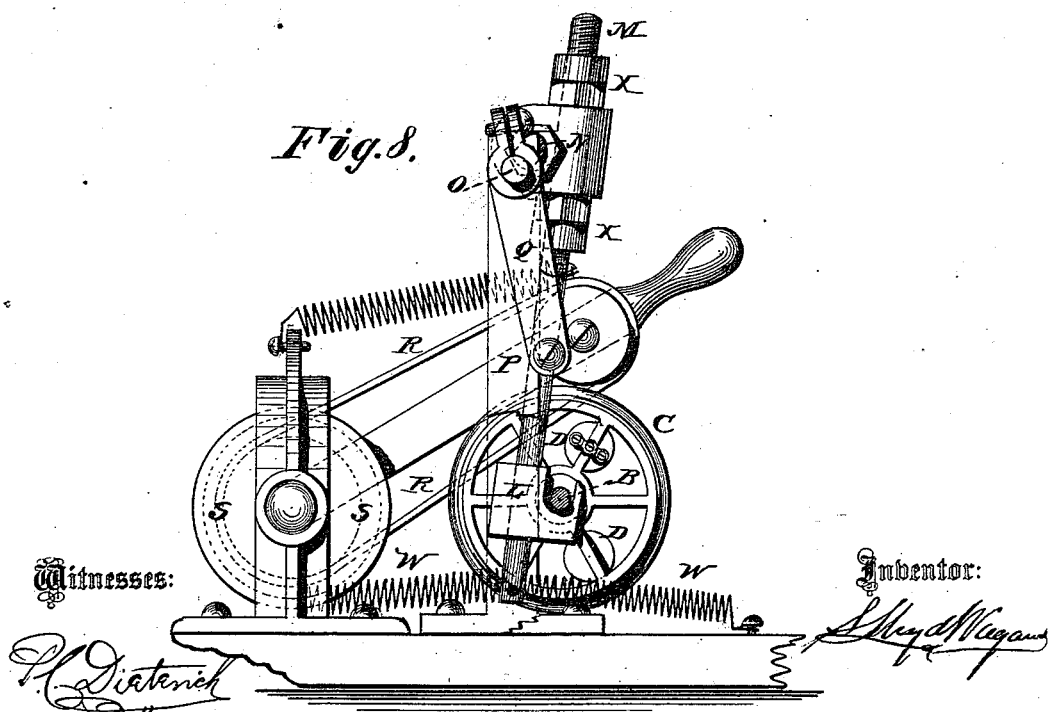

Figure 1 shows a plan of a pair of wheels and axle for railway service; Fig. 2, a side elevation; Fig. 3, an elevation of an apparatus for adjusting and testing the wheels; and Figs. 4, 5, and 6 show modifications of means for effecting the balancing of metal or material of the wheels and connected rotating parts. Figs. 7 and 8 respectively show another and more convenient form of testing apparatus.

The same letters of reference apply to the same parts in the several figures.

A represents the axle, provided with journals B and B'. C and C' are wheels secured upon the axle A.

It is expedient in practice to first effect the balancing of the wheels and axles and other rotating parts with reference to gravitation in the manner usually practiced for mill shafting and pulleys before proceeding to balance them as to centrifugal effect.

The centrifugal balancing of the wheels C and C' and axle A is effected by applying weights D thereto, which weights D may be adjusted radially, so as to increase or diminish their centrifugal effect; angularly, so as to place them in position to counteract the effect of an excess of weight upon the other side of the axis; and longitudinally, so as to change their plane of action and correct any obliquity or inclination of the axis of gyration from the geometric axis of the wheels and journals.

The weights D may be adjusted, as shown in Fig. 1, by clamping them with screws or rivets on the wheels or axle, or by casting them with the wheels and subsequently detaching such as are superfluous by cutting or breaking them off; or they may be adjusted by experimentally ascertaining the amount and position of balance required and applying it in the form of melted metal, and casting it onto the wheel or into cavities prepared to receive and retain it, as shown in Figs. 4, 5, and 6.

Fig. 3 shows an apparatus for testing and adjusting the balance of the wheels in accordance with this invention. E is a vertical shaft, having suspended from it, by means of two universal joints, F and F¹, and an intervening shaft, F², a clamp, G, adapted to centrally hold the wheels and axle by some finished portion of said wheel or axle concentric with the intended axis of rotation. Both the shaft E and couplings F and F¹ and the intermediate shaft F² should be in such equilibrium that, when suspended freely and rapidly rotated, they will revolve accurately upon their geometric axis—*i. e.*, the axis of their form.

From the clamp G, I suspend the axle A and pair of wheels C and C', and rotate them rapidly, and mark the projecting side of the lower wheel, C', and apply the weight D, so adjusted as to cause it to revolve centrally, after which I suspend the axle and wheels by the other end and repeat the operation, and again reverse them, so as to test them as to whether the balance is correct as to longitudinal adjustment, which, when it is attained, permits the wheels and axle, when freely suspended by either end, to revolve on its geometric axis. When thus adjusted, the wheels and axle will roll upon straight rails without appreciable jar or concussion, even at high velocities.

If the shaft $F^2$ be made long, the wheels need not be reversed.

A more convenient testing apparatus is shown in Figs. 7 and 8. The journals B and B' of the axle A rest in bearings L L upon two pendulous rods, M M, adjustable in length by nuts X X X X, and hung from a shaft, N, having eccentric journals O O resting in standards P P, by which the wheels can, by a lever, Q, be readily raised so as to clear the ground. A belt, R, passing over a driving-pulley, S, imparts rotative motion to the wheels C and C' by being placed in contact therewith. The pendulums M M are restrained from excessive oscillation by springs W W, applied to the rods M M. When the wheels are rotating by their momentum the prominent points are marked, and counterbalancing-weights D are applied so as to balance them, as hereinbefore stated.

When loose wheels—i. e., wheels which rotate on their axles—are adjusted, they should each be separately tested and adjusted upon an arbor or mandrel already accurately balanced to rotate upon its geometric axis.

I do not claim as a part of this invention wheels made of material of uniform density and of such perfection and symmetry of form as to comply with the requirement of coincident centrifugal and geometric axes, such wheels, while perhaps possible of production by extraordinary skill and careful workmanship, being impracticable of production on a commercial scale, and are hereby distinctly disclaimed; but, Having described my invention and the mode of operating the same, what I claim as new therein is—

As an article of manufacture, wheels for the rolling support of vehicles balanced by means of weights adjusted thereon, so as to have their axis of centrifugal effect coincident with their geometric axis of journal-bearing and rolling-surfaces, substantially as and for the purpose set forth.

S. LLOYD WIEGAND.

Witnesses:
WM. P. THOMPSON,
J. DANIEL EBY.